United States Patent
Kim et al.

(10) Patent No.: US 7,058,960 B2
(45) Date of Patent: Jun. 6, 2006

(54) OPTICAL PICKUP ACTUATOR, OPTICAL DISC DRIVE USING THE SAME, AND METHOD TO INCREASE DRIVE SENSITIVITY

(75) Inventors: Jeen-gie Kim, Kyungki-do (KR); Dae-jong Jang, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 364 days.

(21) Appl. No.: 10/632,869

(22) Filed: Aug. 4, 2003

(65) Prior Publication Data
US 2004/0205796 A1    Oct. 14, 2004

(30) Foreign Application Priority Data
Nov. 13, 2002    (KR)    ............ 10-2002-0070459

(51) Int. Cl.
*G11B 17/00*    (2006.01)
(52) U.S. Cl. ..................................... 720/683
(58) Field of Classification Search ............ 720/683; 369/44.14, 44.15, 244
See application file for complete search history.

(56) References Cited

U.S. PATENT DOCUMENTS

| | | | |
|---|---|---|---|
| 5,136,565 A * | 8/1992 | Ooyama et al. | ......... 369/44.14 |
| 5,265,079 A | 11/1993 | Getreuer et al. | |
| 5,272,569 A | 12/1993 | White et al. | |
| 5,812,517 A | 9/1998 | Nagasato et al. | |
| 2003/0193854 A1* | 10/2003 | Lee et al. | ................. 369/44.16 |

FOREIGN PATENT DOCUMENTS

| | | |
|---|---|---|
| EP | 0959464 A1 | 11/1999 |
| EP | 1128364 A2 | 8/2001 |
| KR | 10-2001-0026761 | 4/2001 |
| WO | WO 02/054395 A1 | 7/2002 |

OTHER PUBLICATIONS

Notice of Office Action issued by the Korean Patent Office on Nov. 11, 2004 for a corresponding Korean application.

* cited by examiner

*Primary Examiner*—A. J. Heinz
*Assistant Examiner*—Mark Blouin
(74) *Attorney, Agent, or Firm*—Staas & Halsey LLP

(57) ABSTRACT

An optical pickup actuator including a coil, a first magnet, and a second magnet. The coil is installed in a blade holding an objective lens. The first magnet is positioned inside a cavity formed in the center of the coil. The second magnet is installed outside the cavity to face the first magnet. The outer surface of the first magnet facing the coil is polarized into a first pole and inner surface of the first magnet is polarized into a second pole.

20 Claims, 4 Drawing Sheets ated from the following description of the preferred embodiments taken in conjunction with the accompanying drawings in which:

OPTICAL PICKUP ACTUATOR, OPTICAL DISC DRIVE USING THE SAME, AND METHOD TO INCREASE DRIVE SENSITIVITY

CROSS-REFERENCE TO RELATED APPLICATION

This application claims the benefit of Korean Patent Application No. 2002-70459, filed on Nov. 13, 2002, in the Korean Intellectual Property Office, the disclosure of which is incorporated herein by reference.

BACKGROUND OF THE INVENTION

1. Field of the Invention

The present invention relates to an optical pickup actuator and an optical disc drive using the same.

2. Description of the Related Art

Optical disc drives generally include an optical pickup used to record or reproduce information on, or from, a disc that is rotated by a spindle motor. Such an optical pickup records information on the disc by radiating light onto the disc via an objective lens, or reproduces information from the disc by receiving light reflected from the disc. The optical pickup includes an actuator for controlling the position of the objective lens so that light is radiated onto a correct position of the disc.

FIG. 1 illustrates a conventional optical pickup actuator. Referring to FIG. 1, the optical pickup actuator includes a blade 2 on which an objective lens 1 is mounted, and a plurality of wires 6, which support the blade 2 so that the blade 2 moves relative to a holder 3. A focusing coil 4 and tracking coils 5 are installed in the blade 2 to form electrical paths for driving the objective lens 1 in a focusing direction F and a tracking direction T. A pair of magnets 7 and a pair of yokes 8 interact with current flowing through the focusing coil 4 and the tracking coils 5 to generate an electromagnetic force to drive the blade 2 in the focusing direction F and the tracking direction T.

However, in the above-described structure, the effective length of the focusing coil 4 that may be used for driving the blade 2 is less, e.g., only about ¼ of the total length thereof. In other words, as shown in FIG. 2, only an effective portion 4a of the focusing coil 4, i.e., front portion between the pair of magnets 7 is used for driving the blade 2. Leakage flux of the pair of magnets 7 affects other portions of the focusing coil 4, i.e., rear, left, and right portions 4b, 4c, and 4d respectively. However, since current flows through the left and right portions, 4c and 4d respectively, in opposite directions, forces acting in the left and right portions, 4c and 4d respectively, are offset. Though a force acting in the rear portion 4b is weaker than a force acting in the front portion 4a, the direction of the force generated in the rear portion 4b is opposite to the direction of the force generated in the effective front portion 4a. This opposition may result in a decrease in the sensitivity for controlling the blade 2 and may cause an auxiliary resonance in the actuator.

In other words, as illustrated in FIG. 2, a resultant force affecting the blade 20 is substantially at most a value of F1−F2+F3−F4 for driving forces generated at front, rear, left, and right portions, F1, F2, F3 and F4, respectively.

In order to solve these problems, a method of adhering spacers to attempt to block a magnetic force from flowing onto the rear surfaces of the yokes 8 to block the leakage flux into the rear, left, and right portions 4b, 4c, and 4d, respectively, except to the effective portion 4a, has been proposed.

However, in this method, the number of parts and the number of processes of assembling the optical pickup actuator increase. Therefore, an optical pickup actuator having a structure to improve the efficiency of focusing and tracking such coils is necessary.

SUMMARY OF THE INVENTION

Accordingly, it is an aspect of the present invention to provide an optical pickup actuator with a structure to increase the efficiency of the use of coils to control a position of an objective lens. It is another aspect of the present invention to provide an optical disc drive using the same.

According to an aspect of the present invention, there is provided an optical pickup actuator for use with an objective lens and a holder on a base including a blade, a plurality of wires, a coil, a first magnet, and a second magnet. The blade holds the objective lens. The plurality of wires support the blade so that the blade moves relative to a holder on the base. The coil is installed in the blade, with the coil having central opening, a cavity in the center of the coil. A first magnet is installed on the base so as to be positioned inside the cavity, and that interacts with a current flowing through the coil to generate an electromagnetic force. A second magnet is installed outside the cavity so as to at least partially face the first magnet, so that a portion of the coil is positioned between the first magnet and the second magnet. An outer surface of the first magnet facing the coil is polarized into a first pole, and an inner surface of the first magnet is polarized into a second pole.

According to another aspect of the present invention, there is provided an optical disc drive for use with an objective lens and a holder on a base including an optical pickup having a spindle motor to spin a disc, and an optical pickup actuator to control a position of the objective lens to record or reproduce information on, or from, the disc by radiating light onto a desired position of the disc via the objective lens. The optical pickup actuator includes a blade, a plurality of wires, a coil, a first magnet, and a second magnet. The blade holds the objective lens. The plurality of wires support the blade so that the blade moves relative to the holder on the base. The coil is installed in the blade, the coil having a cavity in the center. The first magnet is installed on the base so as to be positioned inside the cavity, and to interact with a current flowing through the coil to generate an electromagnetic force. The second magnet is installed outside the cavity so as to at least partially face the first magnet, so that a portion of the coil is positioned between the first magnet and the second magnet. The outer surface of the first magnet facing the coil is polarized into a first pole, and inner surface of the first magnet is c polarized into a second pole.

Additional aspects and advantages of the invention will be set forth in part in the description which follows and, in part, will be obvious from the description, or may be learned by practice of the invention.

BRIEF DESCRIPTION OF THE DRAWINGS

These features, and/or other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Figure 1:
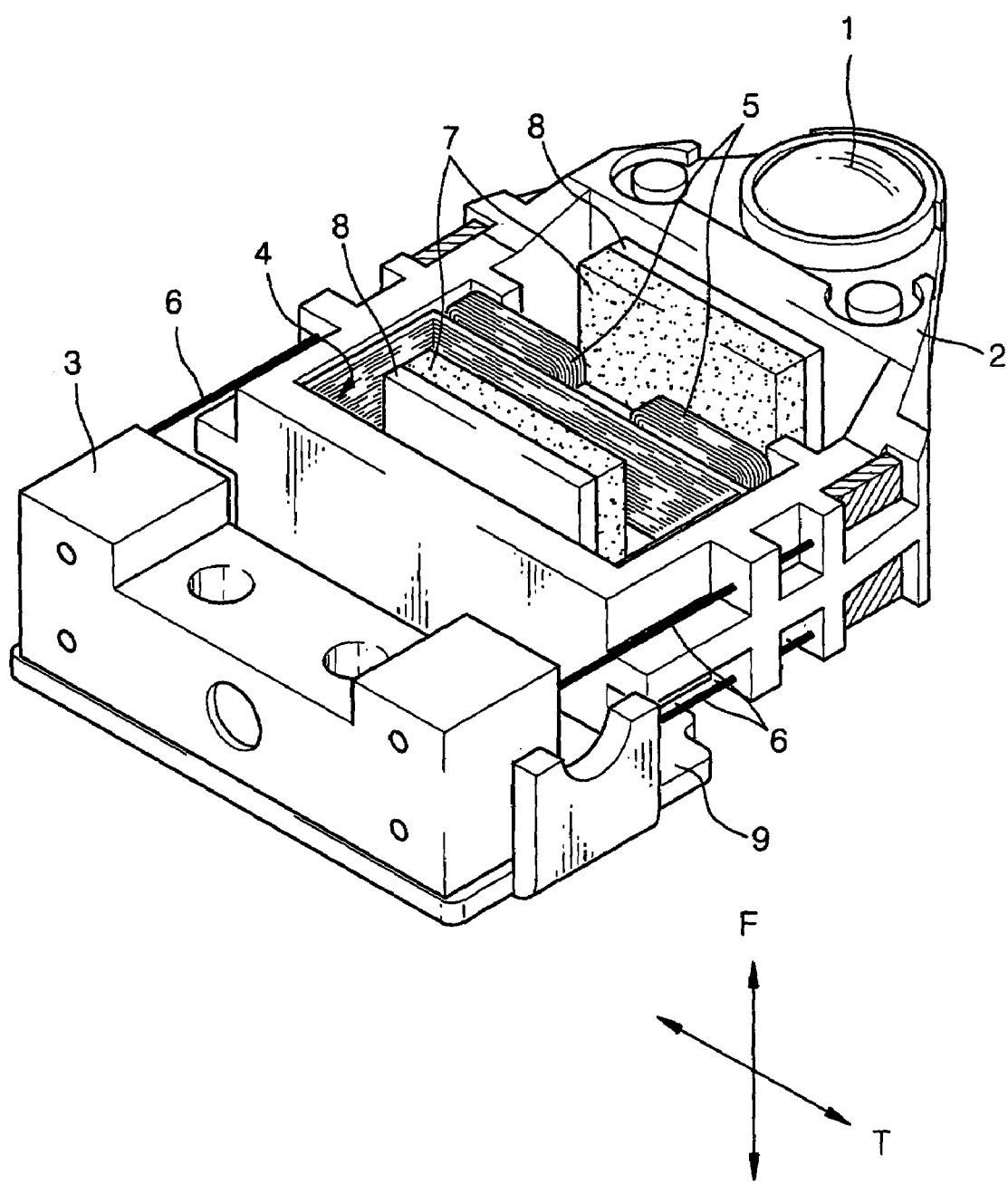
FIG. 1 is a perspective view of a conventional optical pickup actuator.
Figure 2:
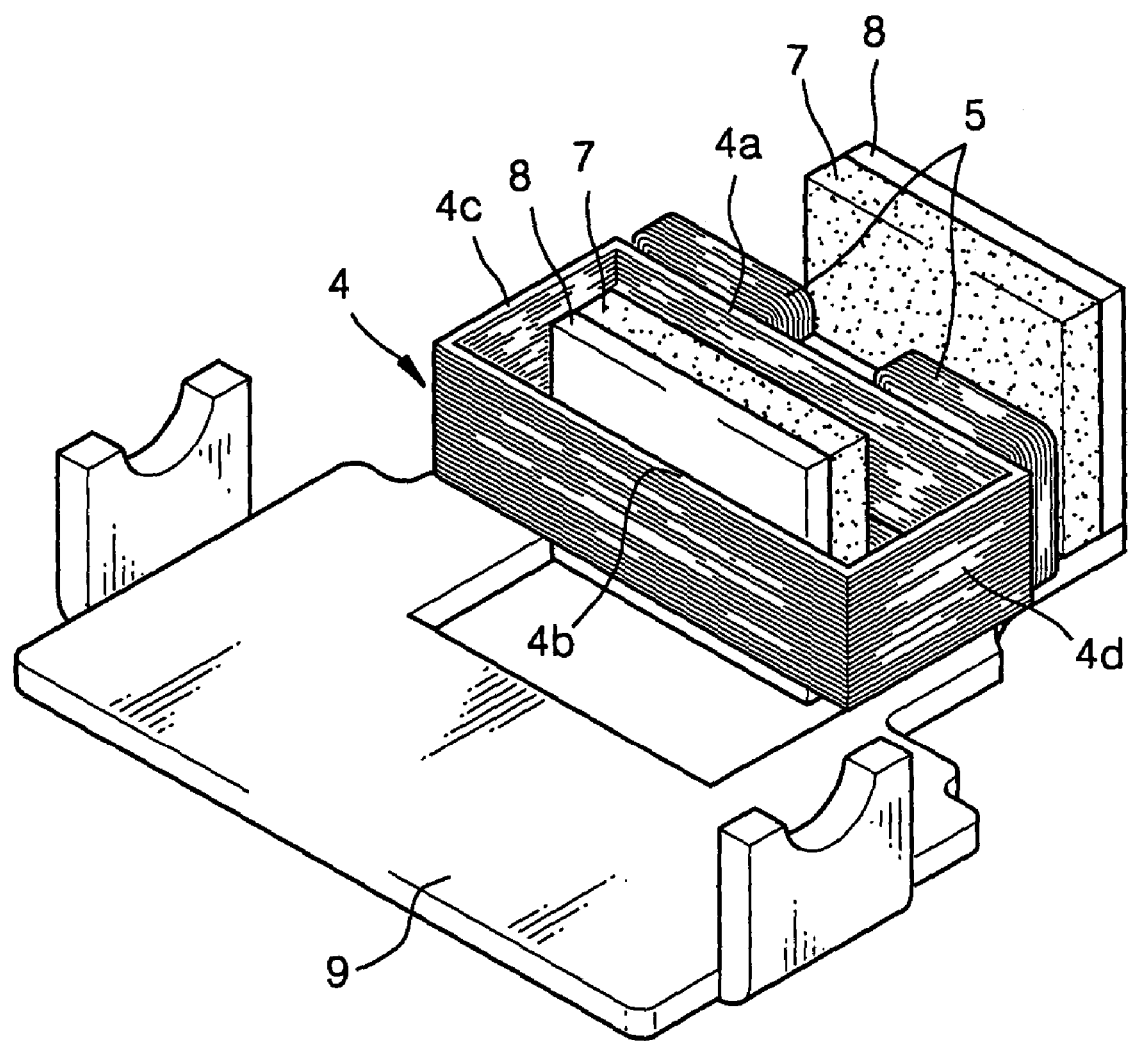
FIG. 2 is a perspective view of electromagnetic driving units of the optical pickup actuator shown in FIG. 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
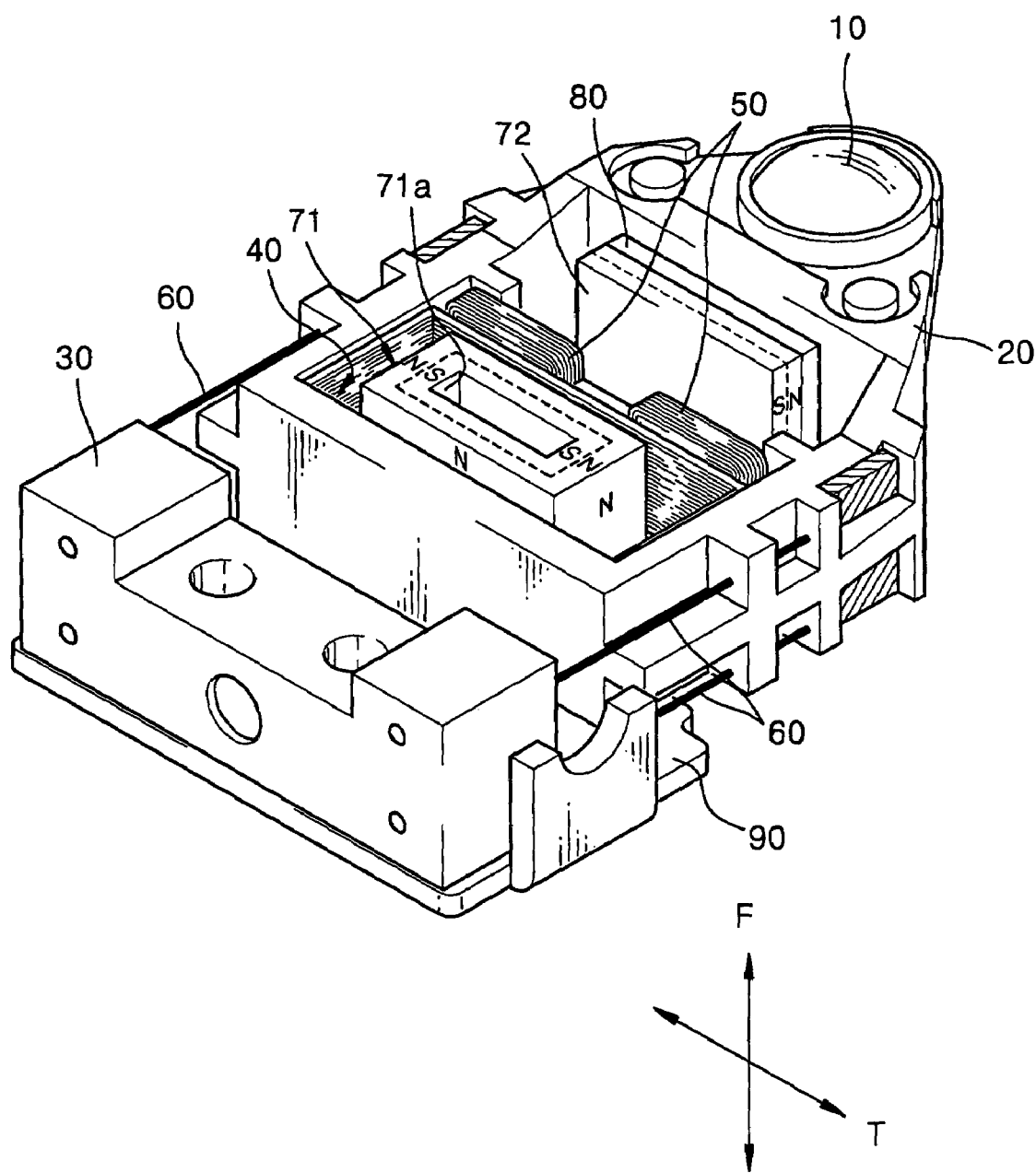
FIG. 3 is a perspective view of an optical pickup actuator according to an aspect of the present invention.

FIG. 3 illustrates an optical pickup actuator, according to an aspect of the present invention. The optical pickup actuator, to be used in an optical disc drive, adjusts the position of an objective lens and radiates light onto a desired position of a disc that is rotated by a spindle motor, in order to perform a recording or reproducing operation. Referring to FIG. 3, a holder 30 is placed on a base 90. A blade 20, on which an objective lens 10 is mounted, is moveably supported by the holder 30 via a plurality of wires 60. A focusing coil 40 and tracking coils 50 are installed in the blade 20. First and second magnets, 71 and 72 respectively, are installed on the base 90 and face the focusing coil 40 and the tracking coils 50.

The focusing and tracking coils, 40 and 50 respectively, and the first and second magnets, 71 and 72 respectively, operate as electromagnetic driving units to drive the blade 20 in a focusing direction F and a tracking direction T, and to control the position of the objective lens 10. Accordingly, when a power supply (not shown) supplies current to the focusing coil 40 and the tracking coils 50, the focusing coil 40 and the tracking coils 50 interact with a magnetic field formed by the first and second magnets, 71 and 72 respectively, thereby generating an electromagnetic force to drive the blade 20 in the focusing direction F and the tracking direction T. Reference numeral 80 denotes a yoke.

Figure 4:
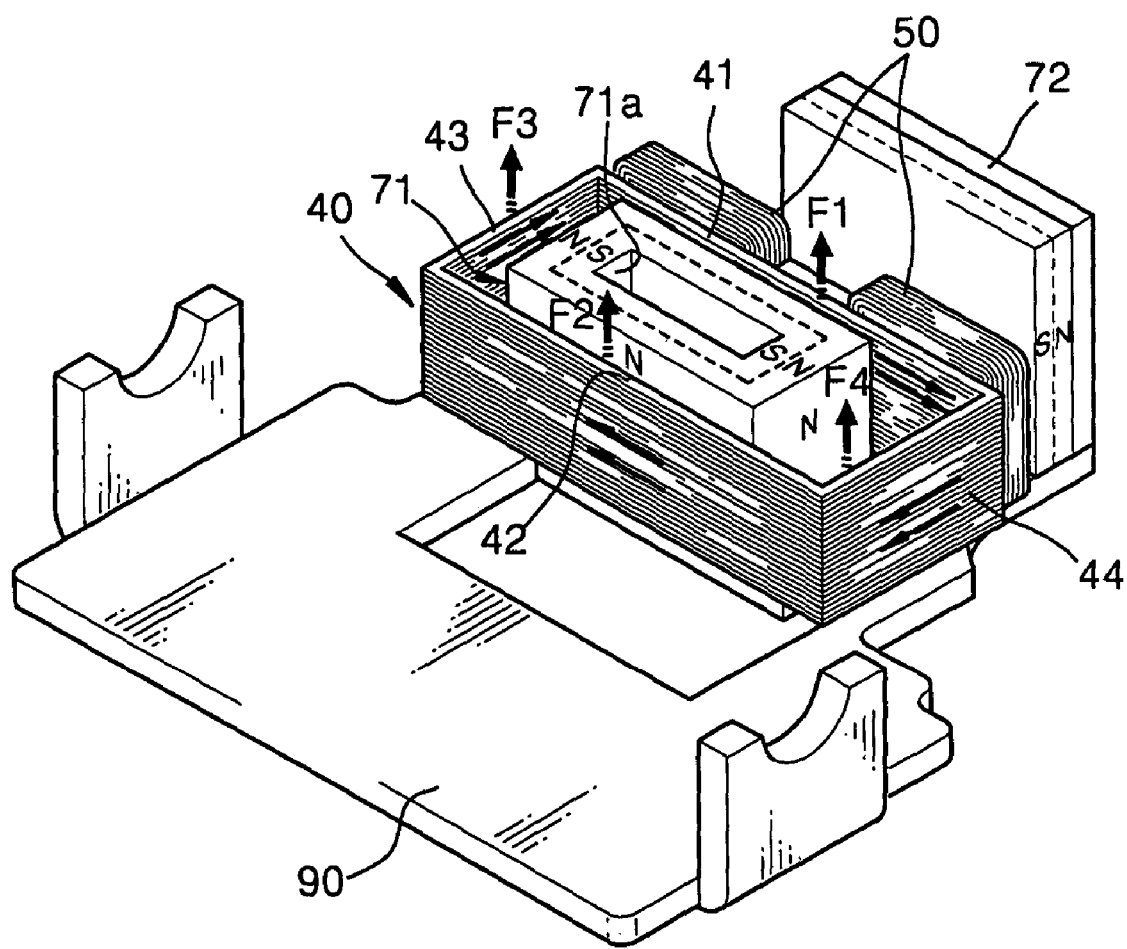
FIG. 4 is a perspective view of electromagnetic driving units of the optical pickup actuator shown in FIG. 3.

The first magnet 71 is disposed in a cavity inside the focusing coil 40, and the second magnet 72 placed outside the focusing coil 40 so as to at least partially face the first magnet 71. The second magnet 72 has varied structures. The first magnet 71 has shapes with an opening 71a in the center thereof, as shown in FIG. 4. Also, inner and outer surfaces of the first magnet 71 are polarized into first and second poles, respectively. For example, when the outer surface is an N pole, the inner surface is an S pole. Thus, increased portions of the outer surface of the first magnet 71 facing the focusing coil 40 belong to the same pole.

According to the above-described structure, a main driving force for driving the blade 20 in the focusing direction F is generated by a current flowing through a front portion 41 of the focusing coil 40 between the first and second magnets 71 and 72 respectively. Currents flowing through rear, left, and right portions, 42, 43, and 44 respectively, of the focusing coil 40 also generate forces in the same direction as the main driving force. Due to the interaction with a leakage flux, forces acting in the left and rights portions 43 and 44 of the rear, left, and right portions 42, 43, and 44, except the front portion 41 generating the main driving force, are offset and a force generated in the rear portion 42 acts in an opposite direction thereto.

According to an aspect of the present invention, a magnetic flux acts so as to generate forces in the front, rear, left, and right portions of the focusing coil, 41, 42, 43, and 44 respectively, that increase or decrease at substantially the same time, and thus the blade 20 moves, e.g., ascends and descends due to the resultant of these forces. Thus, according to an aspect of the present invention, as illustrated in FIG. 4, the resultant force affecting the blade 20 substantially has a value of F1+F2+F3+F4, for driving forces generated at a front portion F1, a rear portion F2, a left portion F3, and a right portion F4. Thus, the sensitivity of the optical pickup actuator is substantially increased. In addition, an auxiliary resonance, which may appear when the rear portion 42 applies a force to the blade 20 in an opposite direction, is substantially prevented.

The foregoing and/or other aspects of the present invention are also achieved by a first magnet 71 with an example opening 71a that is box-shaped, as illustrated in example FIG. 4, that is installed inside the focusing coil 40 so magnetic forces having the same polarity act in substantially all portions of the surface of the first magnet 71, so that substantially all portions of the first magnet 71 generate driving forces acting in the same direction. Thus, the sensitivity of the optical pickup actuator is increased and the possibility that an auxiliary resonance will occur is minimized.

The foregoing and/or other aspects of the present invention are achieved by an optical disc drive using an optical pickup actuator according to one aspect of the present invention.

Since current flowing through substantially all portions of a focusing coil is effectively used for driving a blade, the sensitivity of controlling the blade is increased. Also, driving forces are generated in the same direction in the focusing coil, and thus an auxiliary resonance due to unbalance is prevented.

Furthermore, additional members for preventing leakage flux, such as spacers, do not need to be installed. Thus, the processes of assembling the optical pickup actuator is simplified and the product can be made compact and light.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup actuator for use with an objective lens and a holder on a base, comprising:
   a blade holding the objective lens;
   a plurality of wires to movingly support the blade so that the blade moves relative to the holder;
   a coil installed to the blade, walls of the coil defining a cavity in the coil;
   a first magnet installed on the base so as to at least partially be positioned inside the cavity; and
   a second magnet installed outside the cavity so as to at least partially face the first magnet, so that a portion of the coil is positioned between the first magnet and the second magnet,
   wherein an outer surface of the first magnet facing the coil is polarized into a first pole and an inner surface of the first magnet is polarized into a second pole.

2. The optical pickup actuator according to claim 1, wherein the first magnet is box-shaped with walls of the box defining an opening in the box.

3. An optical disc drive for use with an objective lens and a holder on a base, comprising:
  an optical pickup, the optical pickup having a spindle motor that spins a disc; and
  an optical pickup actuator that controls a position of the objective lens to record or reproduce information on or from the disc by radiating light onto a desired position of the disc via the objective lens,
  wherein the optical pickup actuator comprises:
  a blade holding the objective lens;
  a plurality of wires to movingly support the blade so that the blade moves around the holder;
  a coil installed in the blade, walls of the coil defining a cavity in the coil;
  a first magnet installed on the base so as to at least partially be positioned inside the cavity; and
  a second magnet installed outside the cavity so as to at least partially face the first magnet, so that a portion of the coil is positioned between the first magnet and the second magnet,
  wherein an outer surface of the first magnet facing the coil is polarized into a first pole and an inner surface of the first magnet is polarized into a second pole.

4. The optical disc drive according to claim 3, wherein the first magnet is box-shaped with walls of the box defining an opening in the box.

5. The optical pickup actuator according to claim 1, wherein the first magnet interacts with a current flowing through the coil to generate an electromagnetic force.

6. The optical disc drive according to claim 3, wherein the first magnet of the optical pickup actuator interacts with a current flowing through the coil to generate an electromagnetic force.

7. A method to increase drive sensitivity of an optical pickup actuator, comprising:
  flowing a current through a coil in the optical pickup actuator, the coil positioned between a plurality of magnets;
  generating a plurality of forces from the flow of current, wherein each of the plurality of forces is generated in substantially the same direction as a main moving force to move a blade; and
  moving the blade of the optical pickup actuator with the plurality of generated forces.

8. The method to increase drive sensitivity according to claim 7, wherein the moving the blade comprises focusing an objective lens mounted on the blade.

9. An optical pickup actuator for use with an objective lens and a holder on a base, comprising:
  a blade holding the objective lens;
  a plurality of wires to movingly support the blade so that the blade moves relative to the holder; and
  a device having generating capability to generate a plurality of forces to move the blade,
  wherein each of the plurality of forces generated by the device substantially act to move the blade in a same direction as a main driving force.

10. The optical pickup actuator according to claim 9, wherein the device comprises:
  a coil having walls defining a cavity in the coil;
  a first magnet at least partially positioned inside the cavity that interacts with a current flowing through the coil to generate an electromagnetic force; and
  a second magnet installed outside the cavity so as to at least partially face the first magnet, so that a portion of the coil is positioned between the first magnet and the second magnet.

11. The optical pickup actuator according to claim 10, wherein an outer surface of the first magnet facing the coil is polarized into a first pole and an inner surface of the first magnet is polarized into a second pole, opposite the first pole.

12. An optical pickup actuator for use with an objective lens and a holder on a base, comprising:
  a blade having a first cavity;
  a plurality of wires to movingly support the blade so that the blade moves relative to the holder;
  a focusing coil and at least one tracking coil installed within the first cavity of the blade, the walls of the focusing coil defining a second cavity in the focusing coil;
  a first magnet installed on the base so as to be positioned inside the second cavity; and
  a second magnet installed in the first cavity and outside the second cavity so as to at least partially face the first magnet and so that a portion of the focusing coil is positioned between the first magnet and the second magnet,
  wherein an outer surface of the first magnet facing the focusing coil is polarized into a first pole and an inner surface of the first magnet is polarized into a second pole.

13. The optical pickup actuator according to claim 12, wherein the first magnet interacts with a current flowing through the focusing coil to generate an electromagnetic force.

14. An optical pickup actuator for use with an objective lens and a holder on a base, comprising:
  a blade holding the objective lens;
  a plurality of wires to movingly support the blade so that the blade moves relative to the holder;
  a focusing coil and at least one tracking coil installed to the blade, walls of the focusing coil defining a cavity in the focusing coil;
  a first magnet having an opening in the center thereof and disposed in the cavity of the focusing coil; and
  a second magnet positioned outside the focusing coil so as to at least partially face the first magnet and so that a portion of the focusing coil is positioned between the first magnet and the second magnet.

15. The optical pickup actuator according to claim 14, wherein inner and outer surfaces of the first magnet are polarized into opposite poles, and substantially all portions of the outer surface of the first magnet facing the focusing coil belong to the same pole.

16. The optical pickup actuator according to claim 15, wherein a main driving force for driving the blade in a focusing direction is generated by a current flowing through a front portion of a focusing coil, and current flowing through a rear, a left, and a right portion of the focusing coil generate forces in substantially the same direction as the main driving force.

17. An optical pickup actuator for use with an objective lens and a holder on a base, comprising:
  a blade holding the objective lens;
  a plurality of wires to movingly support the blade so that the blade moves relative to the holder;

a focusing coil and at least one tracking coil installed to the blade, walls of the focusing coil defining a cavity in the coil;

a first magnet having an opening in the center thereof, and disposed in a cavity inside the focusing coil; and a second magnet positioned outside the focusing coil so as to at least partially face the first magnet and so that a portion of the focusing coil is positioned between the first magnet and the second magnet.

18. The optical pickup actuator according to claim 17, further comprising an inner surface of the first magnet polarized into a first pole and an outer surface of the first magnet being polarized into a second pole, opposite the first pole, and substantially all portions of the outer surface of the first magnet facing the focusing coil belong to a same pole.

19. An optical pickup actuator for use with an objective lens and a holder on a base, comprising:

a blade having a cavity;

a plurality of wires to movingly support the blade so that the blade moves relative to the holder; and a focusing coil positioned in the cavity;

wherein a magnetic flux acts so as to generate forces in a front, a rear, a left, and a right portion of the focusing coil and a resultant of the forces acts in substantially a same direction as a main moving force to move the blade.

20. The optical pickup actuator according to claim 19, wherein the magnetic flux increases or decreases at substantially the same time in each portion of the focusing coil.

* * * * *